(12) United States Patent
Graham et al.

(10) Patent No.: US 10,532,515 B2
(45) Date of Patent: *Jan. 14, 2020

(54) ADDITIVELY MANUFACTURED COMPONENT WITH LOCATOR ELEMENT FOR ALIGNING SUB-COMPONENTS

(71) Applicant: General Electric Company, Schenectady, NY (US)

(72) Inventors: Michael Evans Graham, Slingerlands, NY (US); John Broddus Deaton, Jr., Niskayuna, NY (US); Mark Allen Cheverton, Mechanicville, NY (US); Thomas Charles Adcock, Glenville, NY (US); Andrew David Deal, Niskayuna, NY (US); Marshall Gordon Jones, Scotia, NY (US); Prabhjot Singh, Guilderland, NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/135,727

(22) Filed: Sep. 19, 2018

(65) Prior Publication Data

US 2019/0016053 A1 Jan. 17, 2019

Related U.S. Application Data

(63) Continuation of application No. 14/789,350, filed on Jul. 1, 2015, now Pat. No. 10,086,567.

(51) Int. Cl.
*B29C 64/386* (2017.01)
*B22F 5/10* (2006.01)
(Continued)

(52) U.S. Cl.
CPC .......... *B29C 64/386* (2017.08); *B22F 3/1055* (2013.01); *B22F 5/10* (2013.01);
(Continued)

(58) Field of Classification Search
CPC ............ B22F 3/1055; B22F 2003/1057; B22F 2998/10; B22F 2999/00; B22F 2003/1056;
(Continued)

(56) References Cited

U.S. PATENT DOCUMENTS 5,075,866 A * 12/1991 Goto .................. G05B 19/4097
700/182
5,505,365 A * 4/1996 Olsen ..................... B23K 26/24
228/102

(Continued)

FOREIGN PATENT DOCUMENTS

CN 104653240 A 5/2015
JP 2000-190086 * 7/2000
WO 2014/210338 A1 12/2014

OTHER PUBLICATIONS

Machine Translation and Third Office Action and Search issued in connection with corresponding CN Application No. 201610500454.4 on Nov. 13, 2018.

*Primary Examiner* — Chun Cao
(74) *Attorney, Agent, or Firm* — Dority & Manning, P.A.

(57) ABSTRACT

A method that includes additively manufacturing with an additive manufacturing (AM) system a sub-component that has a locator element. Using a control system of the AM system for positioning a first location of the locator element. Selectively placing a portion of another sub-component adjacent to the locator element, based on the positioning. Then attaching the second sub-component to the first sub-component in a region, wherein the region is based on the positioning knowledge from the control system so as to (Continued)

make a component. A component that comprises a first sub-component that has an AM locator element; and a second sub-component attached to the first sub-component, wherein the locator element is attached to the second sub-component within the same additive manufacturing build chamber as the first sub-component.

12 Claims, 5 Drawing Sheets

(51) Int. Cl.
      *B22F 3/105*       (2006.01)
      *B22F 7/06*       (2006.01)
      *B22F 7/08*       (2006.01)
      *G05B 19/4099*       (2006.01)
      *B29C 64/153*       (2017.01)
      *B29C 64/40*       (2017.01)
      *B23K 26/20*       (2014.01)
      *B23K 26/342*       (2014.01)
      *B33Y 10/00*       (2015.01)
      *B23K 101/04*       (2006.01)
      *B33Y 50/02*       (2015.01)
      *B23K 101/12*       (2006.01)

(52) U.S. Cl.
CPC ................ *B22F 7/062* (2013.01); *B22F 7/08* (2013.01); *B23K 26/206* (2013.01); *B23K 26/342* (2015.10); *B29C 64/153* (2017.08); *B29C 64/40* (2017.08); *B33Y 10/00* (2014.12); *G05B 19/4099* (2013.01); *B22F 2003/1058* (2013.01); *B23K 2101/04* (2018.08); *B23K 2101/12* (2018.08); *B33Y 50/02* (2014.12); *G05B 2219/35134* (2013.01); *G05B 2219/49007* (2013.01); *Y02P 10/295* (2015.11)

(58) Field of Classification Search
CPC .......... B22F 2003/1058; B22F 2203/03; B22F 3/1035; B22F 7/06; B22F 5/10; B29C 67/0088; B29C 64/153; B29C 64/386; B29C 64/40; B29C 67/0077; B29C 67/0092
USPC ........................................................ 700/119
See application file for complete search history.

(56) References Cited

U.S. PATENT DOCUMENTS

| | | | |
|---|---|---|---|
| 6,572,807 B1 * | 6/2003 | Fong | B33Y 10/00 264/237 |
| 8,506,836 B2 * | 8/2013 | Szuromi | B22F 3/1055 216/102 |
| 8,513,562 B2 * | 8/2013 | Bichsel | B22F 3/1055 219/121.13 |
| 10,086,567 B2 * | 10/2018 | Graham | B23K 26/206 |
| 2004/0107019 A1 * | 6/2004 | Keshavmurthy | G05B 19/4097 700/118 |
| 2011/0106290 A1 * | 5/2011 | Hovel | B22F 3/1055 700/120 |
| 2015/0048064 A1 | 2/2015 | Cheverton et al. | |
| 2015/0177158 A1 | 6/2015 | Cheverton | |
| 2015/0258705 A1 * | 9/2015 | Hirata | B33Y 10/00 428/210 |
| 2016/0221264 A1 * | 8/2016 | Doherty | B33Y 10/00 |

* cited by examiner

ADDITIVELY MANUFACTURED COMPONENT WITH LOCATOR ELEMENT FOR ALIGNING SUB-COMPONENTS

BACKGROUND OF THE INVENTION

The present invention relates generally to additive manufacturing techniques and, more specifically, to methods for additively manufacturing components and components made from the methods.

Components and products created with conventional additive manufacturing methods are known to have poor surface finish and excessive roughness, in particular, on any downward facing surfaces. These shortcomings impinge on the ability to create certain structures including, for example, horizontal tubes, arches, chambers (closed and otherwise), and the like. These deficiencies in downward facing surfaces lead to reduced part fatigue life, accumulation of material against rough surfaces, flow and turbulence problems for circulating fluids, and fluid leakage from the porosity. As a result, conventional additive methods are typically avoided in product design where attributes such as large unsupported overhangs and other downward facing surfaces may be called for.

With precision component manufacturing, in particular when multiple sub-components are involved, a time consuming and integral step is the fixturing, positioning, and/or refixturing of the subcomponents. This step(s) is often required to place a sub-component in a precise location prior to any final attachment step(s) of the sub-component to the base workpiece and/or other sub-component(s).

Accordingly, there is an ongoing need for improving upon manufacturing techniques.

BRIEF DESCRIPTION

The present invention overcomes at least some of the aforementioned drawbacks by providing a method of additively manufacturing components and components made from these same methods that result in improved components. More specifically, the present invention is directed to an improved methodology that allows for components to have improved finishes on certain surface(s) of the components and/or be constructed with more simplified steps of manufacturing with no concomitant diminution of quality.

Therefore, in accordance with one aspect of the invention, a method comprises: additively manufacturing with an additive manufacturing system a first sub-component having at least one locator element, thereby using a control system of the additive manufacturing system for positioning a first location of the at least one locator element; selectively placing a portion of a second sub-component adjacent to the at least one locator element of the first sub-component, based on the positioning; and attaching the second sub-component to the first sub-component in a region, wherein the region is based on the positioning from the control system of said additive manufacturing system, thereby defining a component.

Therefore, in accordance with another aspect of the invention, a component comprises: a first sub-component, wherein the first sub-component has an additively manufactured locator element; and a second sub-component attached to the first sub-component, wherein the locator element is attached to the second sub-component within the same additive manufacturing build chamber as the first subcomponent.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Aspects of the present invention have been shown to offer advantages over previous additive manufacturing methodologies by, for example, enabling enhanced design freedom (e.g., the ability to make large overhung structures), improving efficiencies in manufacturing (e.g., fewer steps), and making functional improvements. Ultimately, opportunities for improved componentry manufacturing are made available.

Figure 1A:
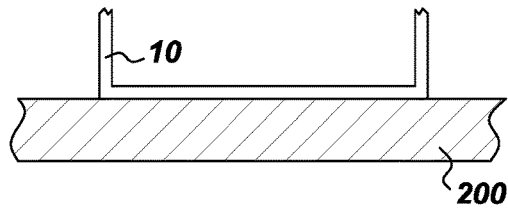
FIGS. 1A-1E are cross-sectional elevation views of a component being sequentially built incorporating aspects of the present invention.

Referring to FIGS. 1A through 1E, a cross-sectional elevation view of an exemplary component being manufactured via an exemplary method is shown in chronological sequence. As depicted in FIG. 1A, a first sub-component 10 is additively manufactured on a build plate 200 with a laser of a laser system (see e.g., FIG. 2). The first sub-component 10 can include at least a first surface.

Figure 1B:
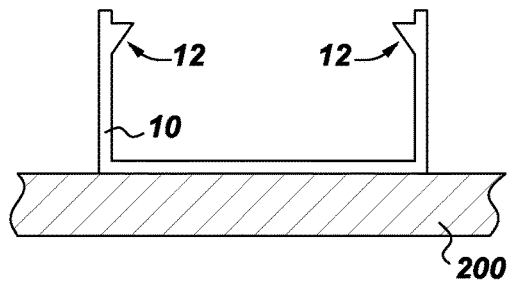

Referring to FIG. 1B, one or more locator elements 12 are provided on the first sub-component 10. As shown, the locator element(s) 12 may fully surround a periphery of the first sub-component 10. Alternatively, the locator element(s) 12 may be intermittently placed. In an embodiment, the locator element(s) 12 may also comprise at least one support element. For example, as shown in FIG. 1B the locator elements 12 also serve as structural support elements for a second sub-component 20 (see FIG. 1C). By using additive manufacturing techniques in making the first sub-component 10, and by applying subsequent processes or sub-components within the same build environment (e.g., build chamber), and including at least one locator element 12, precise positioning at one or more locations 18 (FIG. 2) of the first sub-component 10 via additive manufacturing allows for subsequent processes or sub-components 20, 40 (see e.g., FIG. 1E) to be precisely applied to the first sub-component 10. That is, the control system 230 (FIG. 2) of the laser/additive manufacturing system has requisite positional data as to the first location 18. The knowledge of this first location 18 by the control system 230 will allow for improvement of manufacturing techniques, as discussed herein.

Figure 1C:
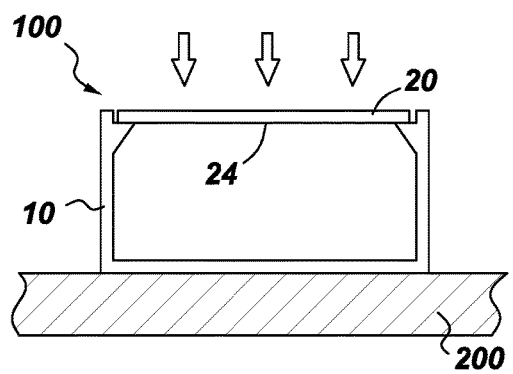
Figure 2:
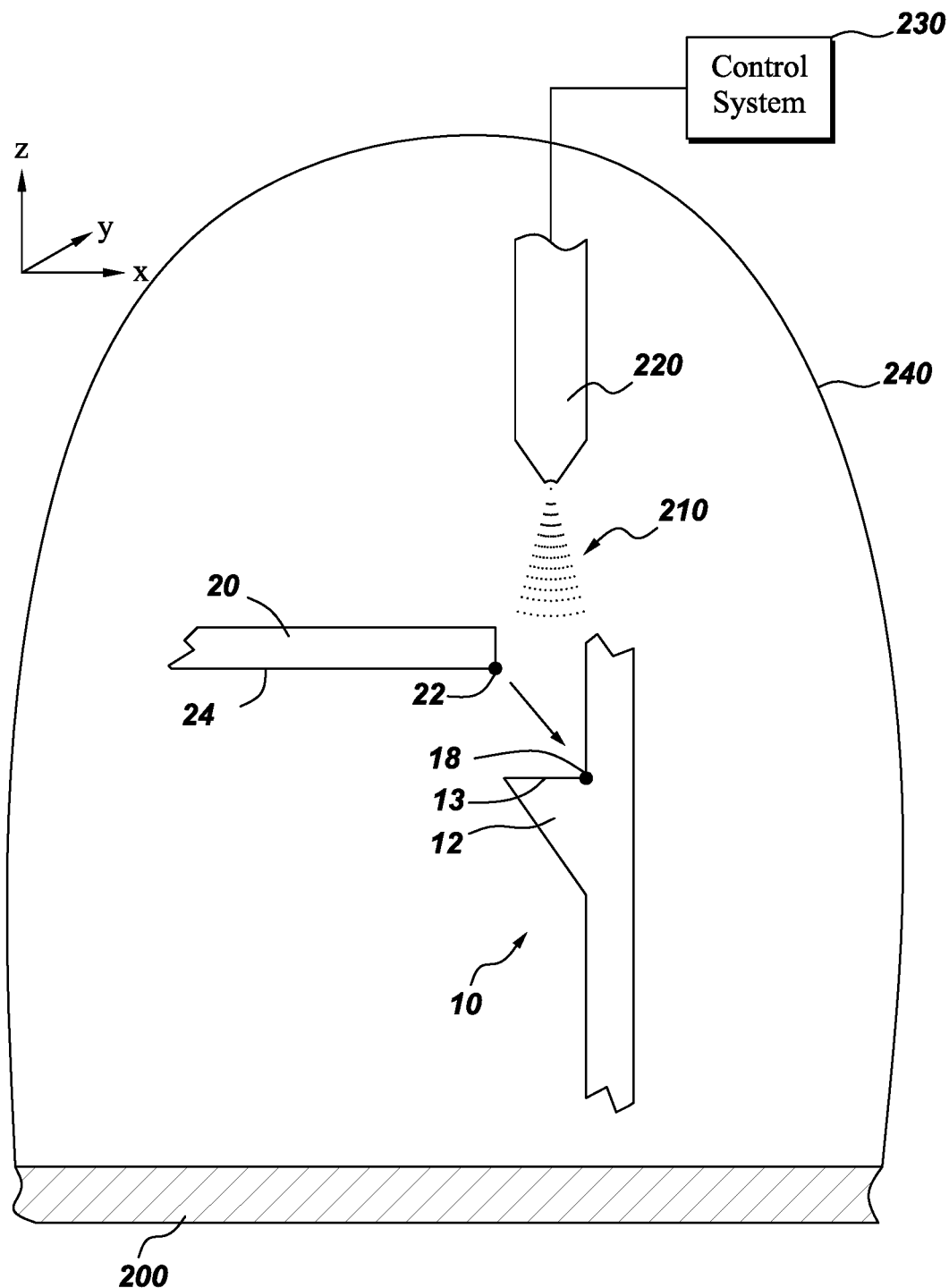
FIG. 2 is a cross-sectional schematic view of portions of a component being constructed according to an embodiment of the present invention.

Referring to FIG. 1C, a portion of the second sub-component 20 is selectively placed adjacent to the at least one locator element 12 the first sub-component 10, based on the positioning of the first location of the locator element 12 as known by the control system 230 (FIG. 2). As shown, the second sub-component 20 includes at least one second surface 24. In the embodiment shown, the second sub-component 20 is placed such that the second surface 24 is facing substantially downward in relation to the component 100. The second sub-component 20 may be manually, robotically, or a combination, placed on or adjacent to the first sub-component 10.

The second sub-component 20 may be made or processed via one or more of the following techniques: additive manufacturing, casting, forging, machining, rolling, extrusion, and other material processing methods.

Figure 1D:
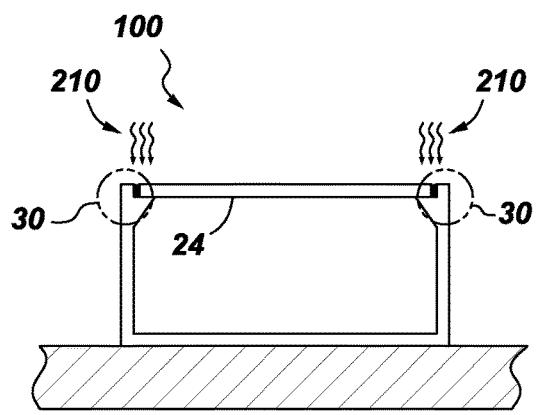

Referring to FIG. 1D, a region 30 of both the first sub-component 10 and second sub-component 20 is attached (e.g., thermally welded 210 with the laser 220 (FIG. 2)) at the location 30 previously known by the control system 230 (FIG. 2) as evidenced by the locator element 12. With the second sub-component 20 attached to the first sub-component 10, a component 100 is defined. As shown, the region 30 may be a joint or seam area. The region 30 may by thermally welded by a laser 220 (FIG. 2) operating in a pulsed-mode or continuous mode. Alternatively, an electron beam may be used for the thermal welding.

As shown in FIG. 1D, the thermal welding 210 may take place in the region 30 wherein the region 30 is above a void, or space, region. The region 30 may be recessed. In this manner, components that have interior regions and/or downward facing surfaces may be more readily manufactured. Further, the heat source for thermal welding 210 may be built in the additive build chamber (See e.g., FIG. 2).

Various methods may be used to attach the second sub-component 20 to the first sub-component 10. Attaching may be done by welding. Various welding methods may be used including, but not limited to, gas welding, e-beam welding, friction stir welding, ultrasonic welding, and thermal welding. The welding source may comprise any suitable source including, but not limited to, a laser.

Figure 1E:
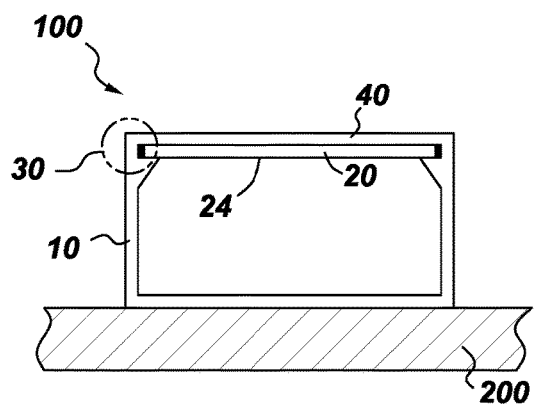

Referring to FIG. 1E, an exemplary finished component 100 is shown. Optionally, after the thermal welding (see FIG. 1D), an additional (e.g., third) sub-component 40 may be placed or additively deposited on top of the second sub-component 30. In any event, the completed component 100 may comprise, as shown, a closed chamber having a downward facing surface. Once the thermal welding (FIG. 1D) is completed, the resultant part can be detached from the build plate 200 for further processing and/or additive deposition can be restarted.

A variety of additive manufacturing techniques, now known or later developed may be employed to make one or all of the sub-components that lead to the finished component. For example, direct metal laser melting (DMLM) may be used. Alternatively, electron beam (EB) additive manufacturing methods may be used.

A variety of structures and shapes of components than just those depicted may be made with the methods herein. For example, the component may comprise a chamber (open or closed), an arch, a tube, a structure having an overhang, a structure having a sculpted surface, and the like. Similarly, the component may comprise a combination of these attributes.

Referring to FIG. 2, a schematic view of an exemplary additive manufacturing system is depicted. The system may include a laser 220 connected to a control system 230. More than one sub-component (e.g., 10, 20, 40) may be additively manufactured in a build chamber 240 on a build plate 200. As shown, the laser 220, working in consort with control system 230, may additively manufacture and thermally weld precisely in an x-y-z coordinate system. Because the control system 230, as discuss herein, has precisely placed the location 18 of the locator element 12, the control system 230 knows the location of the first sub-component 10 placed at location 18 within the repeatability of the control system 230. In this manner the precision locating of the second sub-component 20 adjacent to the first sub-component 10 does not require any additional fixturing of the first or second sub-components 10, 20. As shown, a location 22 of the second sub-component 20 may be precisely located adjacent to the location 18 of the locator element 12 of the first sub-component 10. Subsequent thermal welding 210 can ensue to attach the sub-components 10, 20 to each other. This precision locating is accurate and repeatable to within a width of the laser beam and/or within the repeatability of the laser system. Additional benefits are possible when all of the steps of the method are done in the same build chamber and/or on the same build plate.

Figure 3:
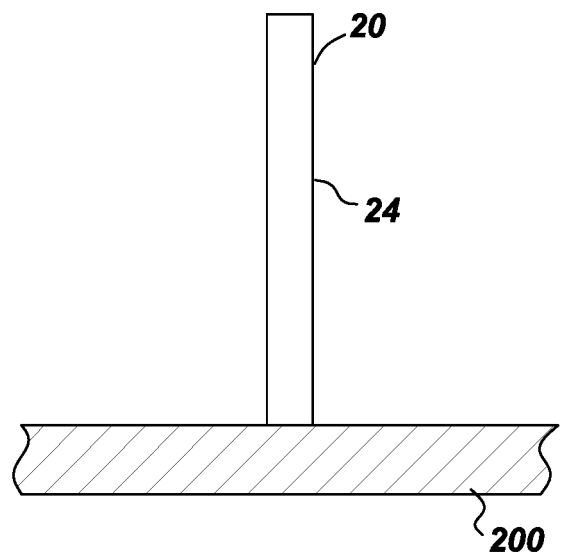
FIG. 3 is a cross-sectional elevation view of a subcomponent according to another embodiment of the present invention.

Referring to FIG. 3, the second sub-component 20 is shown being additively manufactured in a certain configuration. By example FIG. 3 depicts the second sub-component 20 being additively manufactured on a build plate 200 such that it is made in a substantially vertical configuration. In this manner, a surface 24 may then be installed such as shown in FIG. 1D so that a downward facing surface 24 results in the component 100.

Figure 4:
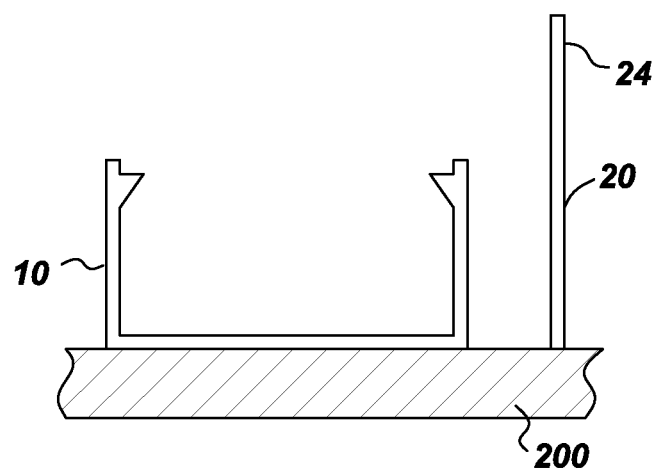
FIG. 4 is a cross-sectional elevation view of a subcomponent according to another embodiment of the present invention.
Figure 5A:
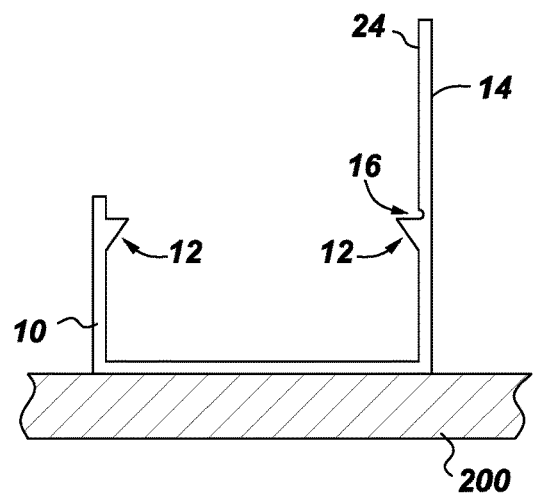
FIGS. 5A-5C are cross-sectional elevation views of a component being sequentially built incorporating aspects of the present invention.
Figure 5B:
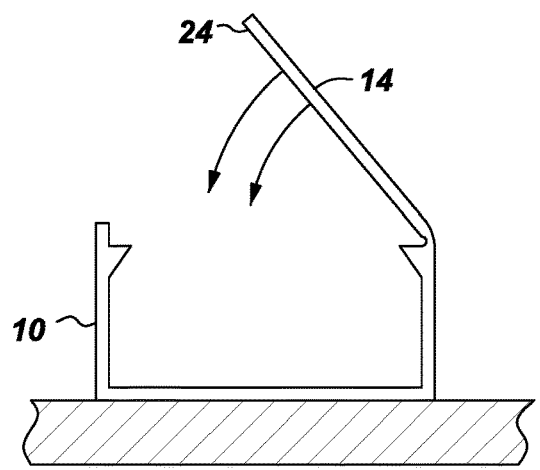
Figure 5C:
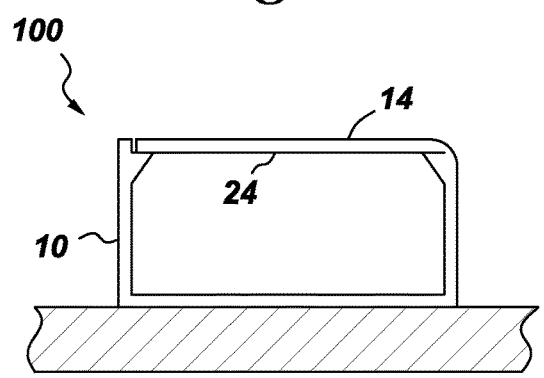

Referring to FIG. 4, a first and second sub-component 10, 20 are shown being additively manufactured on a common, or shared, build plate 200. In this manner, time in repositioning the sub-component(s) 10, 20 is saved. Other configurations of the sub-components, other than that depicted, may be use when sharing the build plate 200. Collectively FIGS. 5A through 5C show a temporal progression of the manufacture of a component 100 according to an exemplary method. Referring to FIG. 5A, a first sub-component 10 and second sub-component 14 are additively manufactured as a single monolithic piece. The first sub-component 10 may include one or more locator element 12 and one or more locations (See FIG. 2, element 18). Between the first sub-component 10 and second sub-component 14 may be a narrowed region 16. As shown in FIG. 5B, the second sub-component 14 may be defined by rotating a portion of the subcomponent 14 made in FIG. 5A around the narrowed region 16. As FIG. 5C depicts the second sub-component 14 then is fully placed on the first sub-component 10. In this manner, time may be saved by not requiring any moving and/or refixturing of the sub-components 10, 14 on the build plates 200 in order to make the component 100. The completion of the component 100 may follow the steps as shown and discussed for example with regards to FIGS. 1D and/or 1E.

Figure 6:
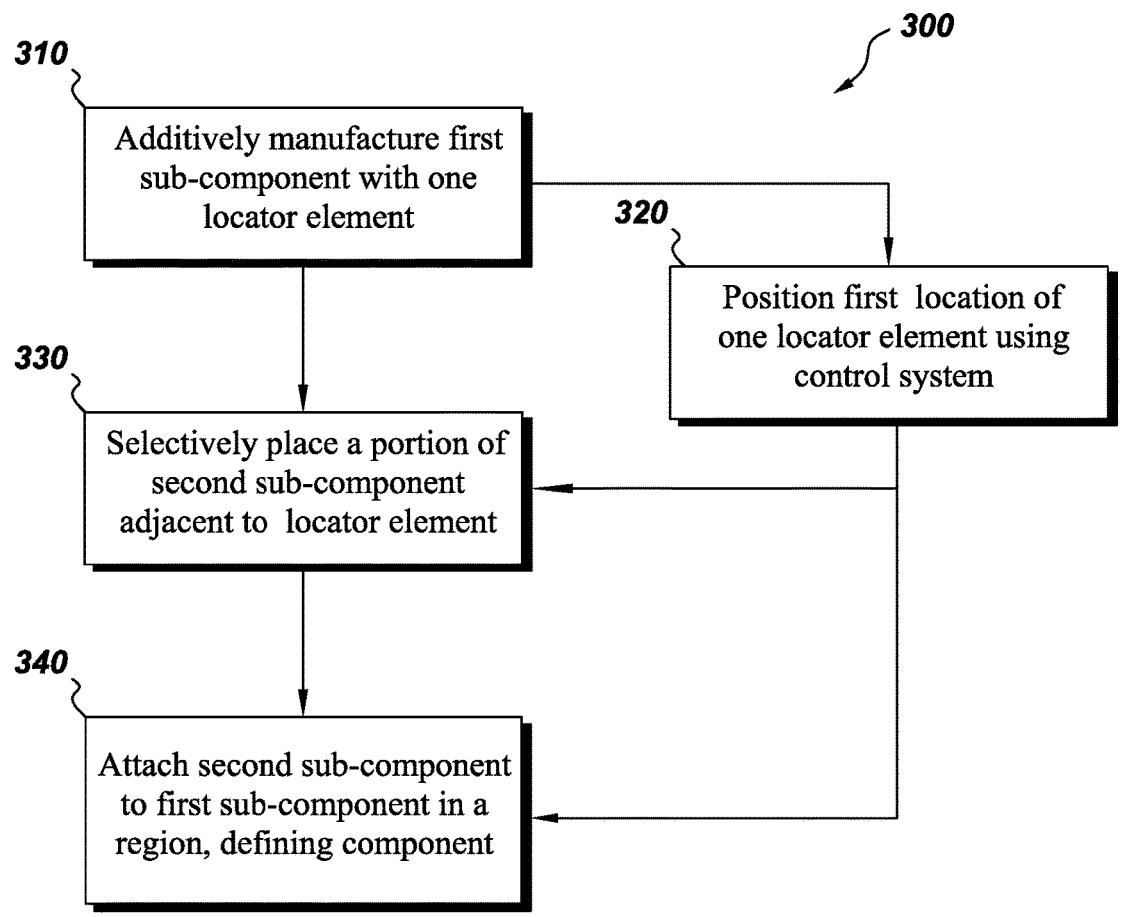
FIG. 6 is a flowchart depicting a method according to aspects of the present invention.

Referring to FIG. 6, a flowchart of an exemplary method is shown. The method 300 comprises a series of steps including, at 310, additively manufacturing a first sub-component having at least one locator element. Based on the additive manufacturing 310, the method 300 at 320 positions a first location of the at least one locator element that is known to the control system of the additive manufacturing system. The method 300 then selectively places a portion of a second sub-component adjacent to the at least one locator element of the first sub-component, at 330, at the location known to the control system (e.g., first location) from 320. At 340 the second sub-component is thermally welded to the first sub-component in a region, with the application of thermal energy at and with respect to the location based on the positioning known to the control system (e.g., first location) from 320. Subsequent to the completion of the component under these methods, the component may then receive additional additive manufacturing processes and/or the attachment of additional sub-component(s) thereto.

While the embodiments illustrated and described herein may be used wherein the additive manufacturing and thermal welding are typically done by a laser and laser system, other means can be used. For example and not by limitation, the additive manufacturing and/or thermal welding may alternatively be done by induction heating.

Therefore, in accordance with one aspect of the invention, a method comprises: additively manufacturing with an additive manufacturing system a first sub-component having at least one locator element, thereby using a control system of the additive manufacturing system for positioning a first location of the at least one locator element; selectively placing a portion of a second sub-component adjacent to the at least one locator element of the first sub-component, based on the positioning; and attaching the second sub-component to the first sub-component in a region, wherein the region is based on the positioning from the control system of said additive manufacturing system, thereby defining a component.

Therefore, in accordance with another aspect of the invention, a component comprises: a first sub-component, wherein the first sub-component has an additively manufactured locator element; and a second sub-component attached to the first sub-component, wherein the locator element is attached to the second sub-component within the same additive manufacturing build chamber as the first subcomponent.

The present invention has been described in terms of the preferred embodiment, and it is recognized that equivalents, alternatives, and modifications, aside from those expressly stated, are possible and within the scope of the appending claims.

What is claimed is:

1. A component comprising:
   a first sub-component, wherein the first sub-component has an additively manufactured locator element; and
   a second sub-component attached to the first sub-component, wherein the additively manufactured locator element is attached to the second sub-component within the same additive manufacturing build chamber as the first sub-component, wherein the first sub-component and the second-component are additively manufactured as a single monolithic piece and are connected by a narrowed region such that the second sub-component is rotatable relative to the first sub-component.

2. The component of claim 1, wherein at least one of the first and second sub-components has at least one substantially downward facing surface.

3. The component of claim 2, wherein the at least one substantially downward facing surface comprises a portion of one of: a tube, an arch, a sculpted surface, and an overhang.

4. The component of claim 1, the first sub-component comprises a support element and the second sub-component comprises a bearing surface configured to bear on the support element.

5. The component of claim 4, the support element and the bearing surface define a connection region, wherein the connection region is thermally welded.

6. The component of claim 5, wherein the connection region is thermally welded with a laser operating in a pulsed-mode.

7. The component of claim 5, further comprising a space beneath the connection region.

8. The component of claim 5, wherein a portion of the connection region is recessed.

9. The component of claim 1, further comprising:
   a third sub-component positioned on a top of the second sub-component.

10. The component of claim 9, wherein the third sub-component is additively deposited directly on the second sub-component.

11. The component of claim 1, wherein the first sub-component defines a plurality of locator element intermittently placed around a periphery of the first sub-component.

12. The component of claim 5, wherein the connection region is thermally welded with an electron beam.

* * * * *